US010313957B2

(12) United States Patent
Chen et al.

(10) Patent No.: US 10,313,957 B2
(45) Date of Patent: Jun. 4, 2019

(54) METHOD AND APPARATUS FOR ACCESS CONTROLLING

(71) Applicant: Telefonaktiebolaget LM Ericsson (publ), Stockholm (SE)

(72) Inventors: Cheng Chen, Nanjing (CN); Yi Geng, Nanjing (CN); Zhike Wang, Nanjing (CN); Aiqin Zhang, Nanjing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 40 days.

(21) Appl. No.: 15/502,905

(22) PCT Filed: Aug. 11, 2014

(86) PCT No.: PCT/CN2014/084135
§ 371 (c)(1),
(2) Date: Feb. 9, 2017

(87) PCT Pub. No.: WO2016/023163
PCT Pub. Date: Feb. 18, 2016

(65) Prior Publication Data
US 2017/0238237 A1   Aug. 17, 2017

(51) Int. Cl.
*H04W 48/02* (2009.01)
*H04W 48/08* (2009.01)
(Continued)

(52) U.S. Cl.
CPC .......... *H04W 48/02* (2013.01); *H04L 43/16* (2013.01); *H04W 48/08* (2013.01); *H04W 48/14* (2013.01)

(58) Field of Classification Search
CPC ..... H04W 48/08; H04W 48/14; H04W 48/02; H04L 43/16
See application file for complete search history.

(56) References Cited

U.S. PATENT DOCUMENTS

| 2009/0061863 A1* | 3/2009 | Huggett | H04L 63/101 455/434 |
| 2011/0107436 A1* | 5/2011 | Cholas | H04N 21/2541 726/29 |
| 2014/0019488 A1* | 1/2014 | Wo | G06F 21/6218 707/784 |

FOREIGN PATENT DOCUMENTS

| CN | 101267662 | 9/2008 |
| CN | 101383719 | 3/2009 |

(Continued)

OTHER PUBLICATIONS

Extended European Search Report for Application No./Patent No. 14899780.2-1854 / 3180944 PCT/CN2014084135—dated Dec. 14, 2017.

(Continued)

*Primary Examiner* — Mandish K Randhawa
(74) *Attorney, Agent, or Firm* — Patent Portfolio Builders, PLLC

(57) ABSTRACT

Embodiments of the present disclosure provide a method in a network element for access controlling. The method comprises receiving an access request message from a terminal device and checking a data structure for maintaining state information of terminal devices from which the network element has received access request messages, in response to the reception of the access request message. The method also comprises determining whether the requesting terminal device is abnormal based on said checking of the data structure and rejecting the access request of the requesting terminal device in response to determining that the requesting terminal device is abnormal.

9 Claims, 6 Drawing Sheets

(51) Int. Cl.
*H04L 12/26* (2006.01)
*H04W 48/14* (2009.01)

(56) References Cited

FOREIGN PATENT DOCUMENTS

| CN | 101867958 | 10/2010 |
|---|---|---|
| CN | 103475637 A | 12/2013 |
| EP | 2 760 234 A1 | 7/2014 |
| WO | 2011 000304 A1 | 1/2011 |
| WO | WO 2011 157003 | 12/2011 |
| WO | 2016 020012 A1 | 2/2016 |

OTHER PUBLICATIONS

PCT Notification of Transmittal of the International Search Report and the Written Opinion of the International Searching Authority, or the Declaration for International application No. PCT/CN2014/084135—dated May 12, 2015.

\* cited by examiner

METHOD AND APPARATUS FOR ACCESS CONTROLLING

PRIORITY

This nonprovisional application is a U.S. National Stage Filing under 35 U.S.C. § 371 of International Patent Application Serial No. PCT/CN2014/084135, filed Aug. 11, 2014, and entitled "Method and Apparatus for Access Controlling."

TECHNICAL FIELD

Embodiments of the present disclosure generally relate to communications systems, and more particularly to a method, an apparatus, and a computer program for access controlling.

BACKGROUND

This section introduces aspects that may facilitate better understanding of the present disclosure. Accordingly, the statements of this section are to be read in this light and are not to be understood as admissions about what is in the prior art or what is not in the prior art.

In a mobile telecommunication network, a user equipment (UE) may access various services by connecting to a core network (CN) via a radio access network (RAN). However, the access to services may fail due to various reasons.

For example, due to differences of UEs in processing capability, memory capacity, hardware performance, or embedded operation system etc. or various UE categories defined in standard specifications, e.g. the third generation partnership project (3GPP) specifications, some UEs are incapable of some kind of services that require specific capabilities. The incapability of these UEs is unknown to the RAN or even CN Therefore, when these UEs try to access such a kind of services, a service failure usually occurs although the UEs may successfully access the RAN and CN.

For another example, incorrect settings in a UE, e.g. wrong Access Point Name (APN) may result in a Non-Access Stratum (NAS) failure while a RAN connection is successfully established, which may also cause the access to services to fail.

A user of a UE may subscribe various application services and the UE may have some specific applications installed therein, some of which may trigger the UE to automatically access the RAN at a specific time, of which the user is not aware. In this case, if the service traffic gets failed due to the capability limitations or wrong settings as mentioned above, or other reasons, e.g. the application server itself being down, the UE being out of credit or the UE's performance being too low etc., the UE that has the specific applications installed therein, may keep trying access to the RAN, and enter an endless loop until the user manually stops it. In another case, some UEs may be maliciously used to continuously attempt the access procedure even though access to the RAN has succeeded. The UEs in the above two cases may be regarded as being abnormal.

FIG. 1 illustrates an example signaling flow of an abnormal UE for trying to access the CN in a Wideband Code Division Multiple Access (WCDMA) network. In this example, the RAN access is successful, while a NAS failure occurs due to a wrong APN, for example. However, after the NAS failure, the UE sends an RRCConnectionRequest again and starts another RAN access attempt. This access attempt may be repeated until the cause for the NAS failure is eliminated.

FIG. 2 illustrates an example signaling flow of an abnormal UE for accessing an application layer server in a 3GPP long term evolution (LTE) communications network. In this example, the UE has successfully accessed the RAN and CN, while a service failure occurs for the application layer server is down, for example. However, after the service failure, the UE sends an RRCConnectionRequest again and starts another RAN access attempt. This access attempt may be repeated until the cause for the service failure is eliminated.

Abnormal UEs may lead to several disadvantages. For example, an abnormal UE may consume RAN resources, especially those on the air interface and take up network capacity meaninglessly. In order to handle its access attempt, both common channels and dedicated channels are occupied. Taking a WCDMA network as an example, a Radio Network Controller (RNC) may also need to initialize NAS connections toward the CN. Therefore, the abnormal UEs corrupt the operator's RAN capacity and weaken the robustness against radio congestion. Furthermore, abnormal UEs also waste resources in the CN, e.g. resources on a Serving Gateway Support Node (SGSN) and Gateway GPRS (General Packet Radio Service) Support Node (GGSN) in a WCDMA network. Moreover, for an abnormal UE with a NAS failure, the RAN accessing procedure appears normal; and for an abnormal UE with an application service failure, all Key Performance Indices (KPIs) appear normal. This makes it difficult for operators to detect the problem and take further actions.

There is an existing patent application CN102143552A, which proposes to prevent the access attempt of a UE after it has experienced a predetermined number of RAN access failures within a certain time period. However, this solution is based on the RAN access failure number and thus does nothing with the above mentioned problems in which the RAN access may always be successful.

3GPP technical specification (TS) 36. 331 defines an "access barring check", according to which, a message is broadcasted in SystemInformationBlock Type 2 towards all UEs to inform UEs to wait for a random time period before a next access attempt after the previous RAN access failure. However, this solution is also based on the RAN access failure, and thus does nothing with the above mentioned problems in which the RAN access may always be successful.

SUMMARY

To address one or more of the above concerns, it would be desirable in the art to provide an access control method, which may deny access requests of a UE as early as possible when the UE is determined to be abnormal.

In a first aspect of the present disclosure, there is provided a method in a network element for access controlling. The method comprises receiving an access request message from a terminal device and checking a data structure for maintaining state information of terminal devices from which the network element has received access request messages, in response to the reception of the access request message. The method also comprises determining whether the requesting terminal device is abnormal based on said checking of the data structure and rejecting the access request of the requesting terminal device in response to determining that the requesting terminal device is abnormal.

In some embodiments, the data structure may comprise entries corresponding respectively to the terminal devices from which the network element has received the access request messages. Each of the entries at least comprises an identifier of a corresponding terminal device, a number of access requests of the corresponding terminal device, a timer for indicating a time elapsed since the entry was started, and a state flag for indicating abnormality or normality.

In some other embodiments, said checking a data structure may comprises obtaining an identifier of the requesting terminal device from the access request message and judging whether the obtained identifier is present in the data structure. Said checking may also comprise if it is judged that the obtained identifier is present in the data structure, then judging whether the state flag corresponding to the obtained identifier indicates abnormality; and if it is judged that the state flag corresponding to the obtained identifier indicates normality, then updating the timer comprised in this entry and judging whether the updated timer indicates expiry. Said checking may further comprise if the updated timer indicates not expiry, then updating the number of access requests and judging whether the updated number of access requests meets a predetermined threshold. Said determining whether the requesting terminal device is abnormal based on said checking of the data structure may comprise if the state flag corresponding to the obtained identifier indicates abnormality, then determining that the requesting terminal device is abnormal; otherwise, if the updated timer indicates not expiry and the updated number meets the predetermined threshold, then determining that the requesting terminal device is abnormal, in a case that the obtained identifier is present in the data structure.

In some other embodiments, the method may further comprising updating the data structure that may comprise, in a case that the obtained identifier is not present in the data structure, then creating a new entry for the requesting terminal device in the data structure and initializing the number of accesses, the timer and the state flag comprised in the new entry. The updating may also comprise, in the case that the obtained identifier is present in the data structure, if the state flag corresponding to the obtained identifier indicates abnormality, then updating the timer corresponding to the obtained identifier and if the updated timer indicates expiry, then deleting this entry from the data structure. The updating may further comprise, if the state flag corresponding to the obtained identifier indicates normality, then in a case that the updated timer indicates expiry, then deleting this entry from the data structure; and in a case that the updated timer indicates not expiry and the updated number meets the predetermined threshold, then causing the state flag to indicate abnormality.

In some further embodiments, the identifier of a terminal device may comprise one of an international mobile subscriber identity (IMSI), a temporary mobile subscriber identity (TMSI), a packet temporary mobile subscriber identity (P-TMSI) and an international mobile equipment identity (IMEI).

In a second aspect of the present disclosure, there is provided an apparatus adapted for access controlling in a network element. The apparatus comprises a receiving module configured to receive an access request message from a terminal device and a checking module configured to check a data structure for maintaining state information of terminal devices from which the network element has received access request messages, in response to the reception of the access request message. The apparatus also comprises a determining module configured to determine whether the requesting terminal device is abnormal based on said checking of the data structure and a rejecting module configured to reject the access request of the requesting terminal device in response that the requesting terminal device is determined to be abnormal.

In a third aspect of the present disclosure, there is provided an apparatus adapted for access controlling in a network element. The apparatus comprises comprising a processor and a memory. The memory containing instructions executable by said processor whereby said apparatus is operative to receive an access request message from a terminal device and to check a data structure for maintaining state information of terminal devices from which the network element has received access request messages, in response to the reception of the access request message. The apparatus is further operative to determine whether the requesting terminal device is abnormal based on said checking of the data structure and to reject the access request of the requesting terminal device in response that the requesting terminal device is determined to be abnormal.

In a fourth aspect of the present disclosure, there is provided an apparatus adapted for access controlling in a network element. The apparatus comprises processing means adapted to receive an access request message from a terminal device and to check a data structure for maintaining state information of terminal devices from which the network element has received access request messages, in response to the reception of the access request message. The processing means is further adapted to determine whether the requesting terminal device is abnormal based on said checking of the data structure and to reject the access request of the requesting terminal device in response to determining that the requesting terminal device is abnormal.

In a fifth aspect of the present disclosure, there is provided a computer program, comprising instructions which, when executed on at least one processor, cause the at least one processor to carry out the method according to the first aspect.

It should be appreciated that, corresponding embodiments of the first aspect are also applicable for the second aspect, the third aspect, the fourth aspect, and the fifth aspect.

With particular embodiments of the techniques described in this specification, by checking a data structure specially designed for maintaining state information of terminal devices from which access request messages have been received on RAN side, the abnormality state of a terminal device may be determined so that the access attempt from the abnormal terminal device may be denied as early as possible and thus valuable resources on the air interface in the RAN and resources in the CN may not be meaninglessly consumed. Accordingly, the network operators may easily locate the problem and decide actions to be taken.

Other features and advantages of the embodiments herein will also be understood from the following description of specific embodiments when read in conjunction with the accompanying drawings, which illustrate, by way of example, the principles of embodiments.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
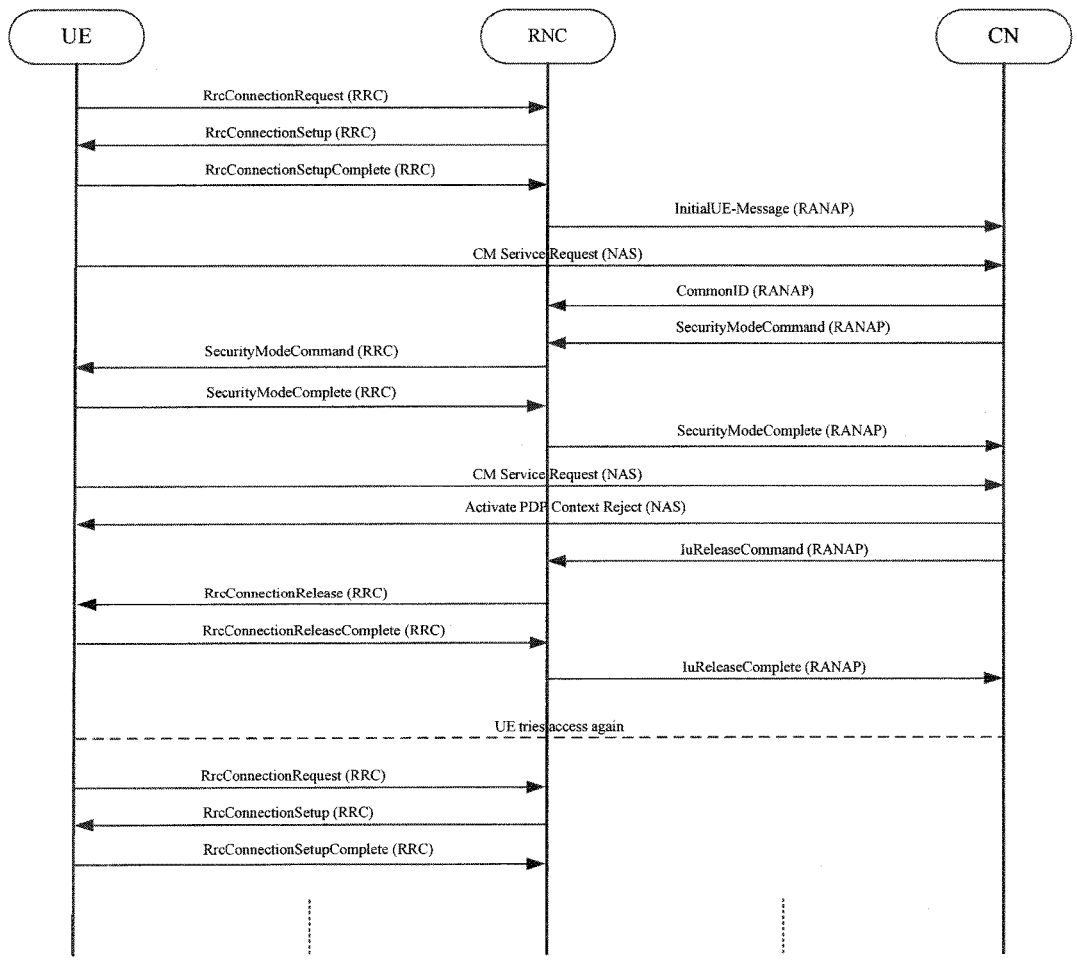
FIG. 1 illustrates an example signaling flow of an abnormal UE for trying to access the CN in a Wideband Code Division Multiple Access (WCDMA) network.
Figure 2:
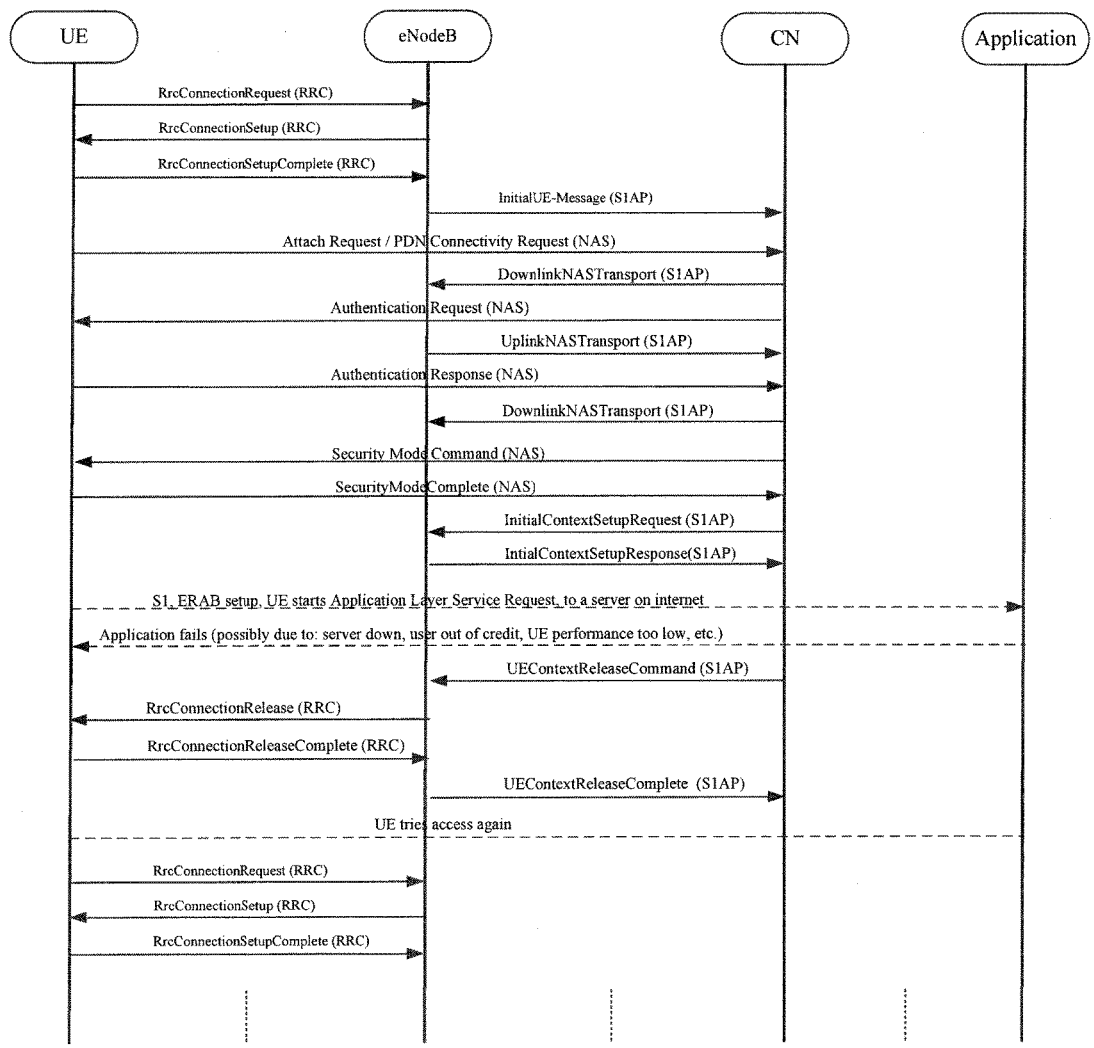
FIG. 2 illustrates an example signaling flow of an abnormal UE for accessing an application layer server in a 3GPP long term evolution (LTE) communications network.

Hereinafter, the principle and spirit of the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment", "an embodiment", "an example embodiment" etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is associated with the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skill in the art to which this disclosure belongs. For example, the term "terminal device" used herein may refer to any terminal having wireless communication capabilities or UE, including but not limited to, mobile phones, cellular phones, smart phones, or personal digital assistants (PDAs), portable computers, image capture devices such as digital cameras, gaming devices, music storage and playback appliances and any portable units or terminals that have wireless communication capabilities, or Internet appliances permitting wireless Internet access and browsing and the like. Likewise, the term "network element" used herein may include but not limited to, RNC and a base station, which sometimes is referred to as e.g. eNB, eNodeB, NodeB, Base Transceiver Station BTS or access point, depending on the technology and terminology used. In the following description, the terms "user equipment" or "UE" and "terminal device" may be used interchangeably and the terms "base station" or "BS" and "eNodeB" or "eNB" may be used interchangeably hereinafter.

The proposed method for access controlling according to embodiments of the present disclosure may be preferably implemented on RAN side rather than CN side for the following two reasons: (1) if the access control is triggered on CN side, some air interface resources have already been wasted and thus the gain of this access control may not be maximized; and (2) on the NAS level, a UE may be routed to different CN nodes, which makes it difficult to be controlled on CN side. Even so, those skilled in the art shall appreciate that the proposed access control method according to the embodiments of the present disclosure is not limited to being implemented on RAN side only and rather, it may also be implemented on CN side according to practical requirements.

In the following, the proposed method for access controlling will be described in detail with reference to FIGS. 3 and 4.

Figure 3:
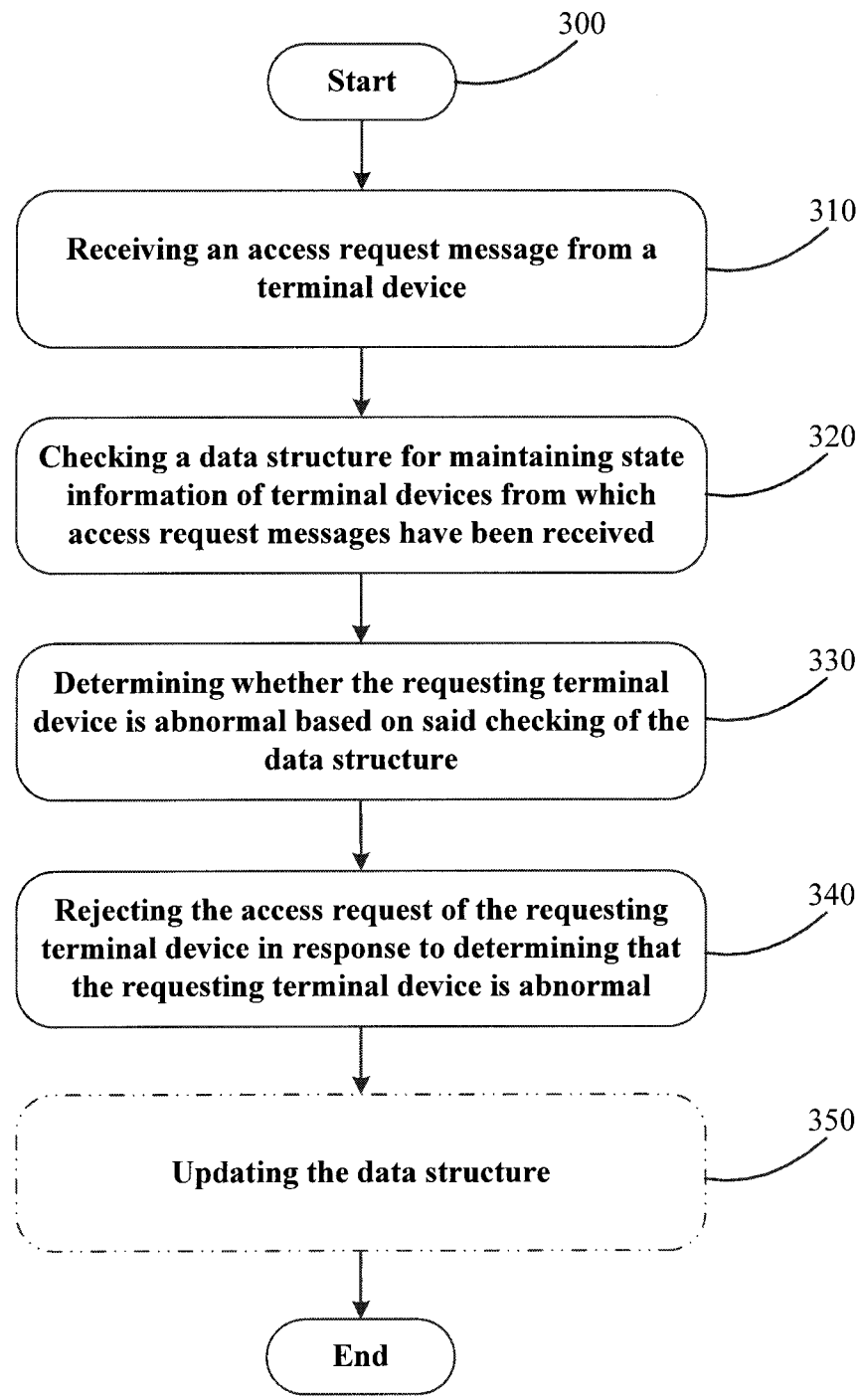
FIG. 3 illustrates a flowchart of a method 300 in a network element for controlling access of a terminal device to the network element according to an embodiment of the present disclosure.

FIG. 3 illustrates a flowchart of a method 300 in a network element, such as an RNC or eNodeB for controlling access of a terminal device or a UE to the network element according to an embodiment of the present disclosure.

At block 310, an access request message is received from the terminal device (which is referred to as the requesting terminal device hereafter), which may be an RRC connection request message, for example. This access request message may comprise identification information of the terminal device, including but not limited to an international mobile subscriber identity (IMSI), a temporary mobile subscriber identity (TMSI), a packet temporary mobile subscriber identity (P-TMSI) or an international mobile equipment identity (IMEI) of the requesting terminal device.

Then at block 320, a data structure for maintaining state information of terminal devices from which the network element has received access request messages is checked. The data structure may be stored locally at the network element or stored remotely at other network nodes but is accessible to the network element. The data structure may be a list or a table comprising a plurality of entries, for example. Each of the plurality of entries may correspond respectively to one of the terminal devices, from which the network element has received the access request messages, and comprise an identifier of a corresponding terminal device and a timer, a number of access requests, and a state flag set for the corresponding terminal device.

The timer may be initialized with a value which equals to a certain period of time according to practical requirements. At every time when the timer is updated, the updated timer may show a time elapsed since the timer was started. If the elapsed time exceeds the initially set value, then the updated timer indicates expiry. In one example, the timer may be started at the same time when the timer is initialized, while the timer is initialized at the same time when the entry comprising the timer is created upon reception of a first access request message from the requesting terminal device within the certain period of time.

The number of access requests may be set to indicate a number of times that the access request message from the requesting terminal device has been received by the network element within the certain period of time as initialized for the timer, which may be an integer.

The state flag may be set to indicate the state of the requesting terminal device, which may be a Boolean value or a character string. For example, in the case of a Boolean value, the value "True" may indicate that the state of the requesting terminal device is abnormal while "False" may indicate that the state of the requesting terminal device is normal. In the case of a character string, "Abnormality" and "Normality" may be respectively used to directly indicate the requesting terminal device being abnormal or normal.

Table 1 illustrates an example of the data structure.

TABLE 1

Example of Data Structure

| ID | Timer | Number of Access Requests | State Flag |
| --- | --- | --- | --- |
| 460030912121001 | 3 s | 4 | False |
| 460030912121011 | 2 s | 6 | True |

In Table 1, the first row illustrates a number of variables, such as the identifier ID of the requesting terminal device and the corresponding timer, number of access requests, and state flag. The second row illustrates an entry corresponding to a first terminal device with an IMSI of 460030912121001. It is clear from this table that the time elapsed since the first access request message is received from the first terminal device is 3s; the first terminal device has tried to access the network element for four times within 3s; and the current state of the first terminal device is normal.

The third row of Table 1 illustrates an entry corresponding to a second terminal device with an IMSI of 460030912121011. The time elapsed since the first access request message is received from the second terminal device is 2 s; the second terminal device has tried to access the network element for six times within 2 s; and the current state of this terminal device is abnormal.

Subsequently in method 300, the state of the requesting terminal device, i.e. abnormality or normality, is determined in block 330 based on the checking of the data structure.

Those skilled in the art shall understand that Table 1 is only an example. Different data structures comprising different entries also fall within the scope of the present disclosure, as long as states of terminal devices can be determined based on these data structures.

Finally in method 300, in response that the requesting terminal device is determined to be abnormal, its access request is rejected by the network element in block 340, for example through signaling a rejection message to the requesting terminal device, which may be RRC signaling.

Figure 4:
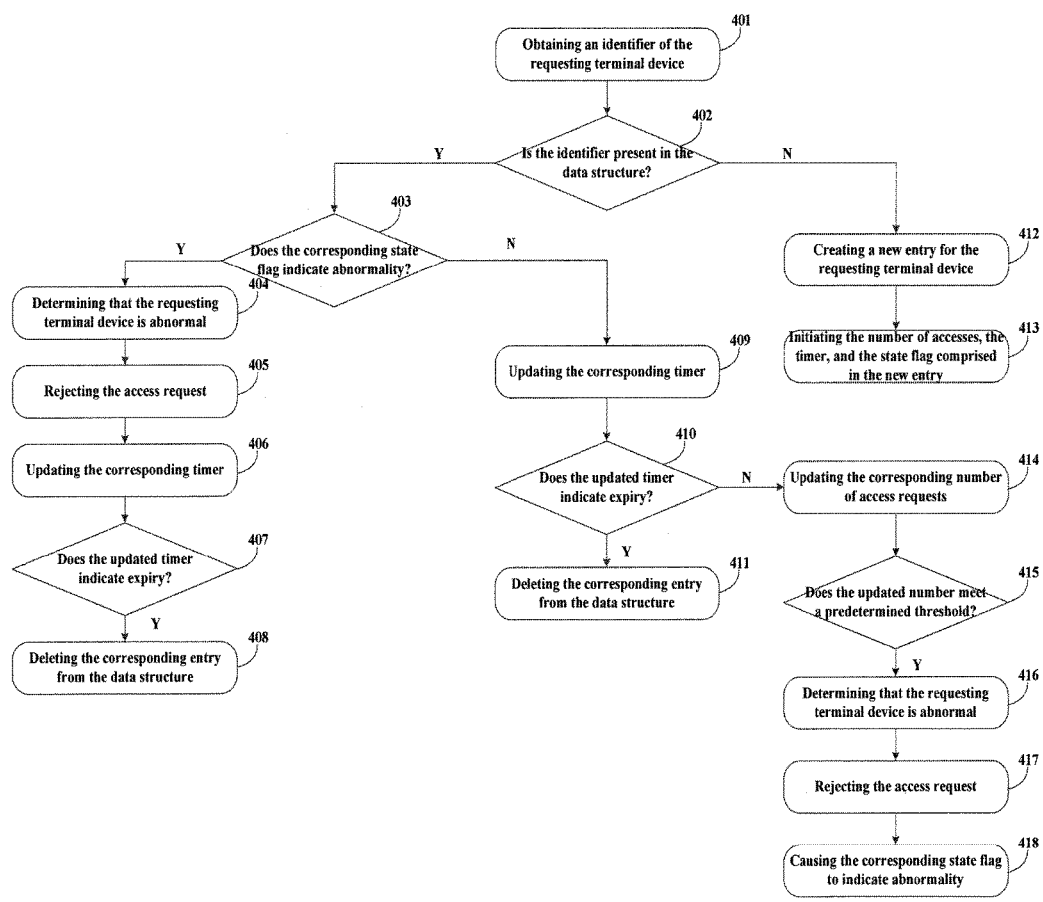
FIG. 4 illustrates a specific example flow for operations in blocks 320-340 of method 300 as illustrated in FIG. 3 and preferred additional operations on the data structure.

FIG. 4 illustrates a specific example flow for operations in blocks 320-340 of method 300 as illustrated in FIG. 3 and preferred additional operations on the data structure. For ease of understanding, details of the operations in blocks 320-340 and the referred additional operations will not be separately described in the following but be introduced in a logic order conforming to the practical situation.

After the access request message is received in block 310, an identifier of the requesting terminal device may be obtained from the access request message in block 401 as illustrated in FIG. 4 and then it is judged whether the obtained identifier is present in the data structure in block 402. Those skilled in the art shall understand that the network operators may decide, according to practical requirements, which identifier will be subject to the proposed access control. For example, the network operators may preset that the access request of a UE for which the obtained identifier is IMSI has a higher priority and thus will not be rejected by the network element. Preferably and additionally, the network operators may also decide which kind of causes for access requesting will be subject to the access control. For example, the network operators may set a higher priority for speech traffic and/or emergency calls and set a lower priority for packet traffic. Accordingly, the speech traffic and/or emergency calls may not be subject to the access control and will not be rejected by the network element.

Afterwards, if the judging result in block 402 shows that the obtained identifier is present in the data structure, then it is judged whether the state flag corresponding to the obtained identifier indicates abnormality in block 403.

If the judging result in block 403 shows that the state flag corresponding to the obtained identifier indicates abnormality, then it may be determined in block 404 that the requesting terminal device is abnormal. Accordingly, the access request of the requesting terminal device is rejected in block 405.

Preferably and additionally, the timer corresponding to the obtained identifier may be updated in block 406 and then it is judged whether the updated timer indicates expiry in block 407. If the judging result in block 407 shows that the updated timer indicates expiry, then the corresponding entry comprising this updated timer may be deleted from the data structure in block 408.

Now, it gets back to block 403 again. If the judging result in block 403 shows that the state flag corresponding to the obtained identifier indicates normality, then the timer corresponding to the obtained identifier may be updated in block 409 and it is judged whether the updated timer indicates expiry in block 410.

If the judging result in block 410 shows that the updated timer indicates expiry, then the corresponding entry comprising this updated timer may be deleted from the data structure in block 411; otherwise, the number of access requests corresponding to the obtained identifier may be updated, e.g. by increasing 1 and then it is judged whether the updated number of access requests meets a predetermined threshold in block 415.

If the judging result in block 415 shows that the updated number meets the predetermined threshold, then it may be determined that the requesting terminal device is abnormal. Accordingly, the access request of the requesting terminal device is rejected in block 417.

Preferably and additionally, the state flag corresponding to the obtained identifier may be updated to indicate abnormality in block 418.

Now, it gets back to block 402 again. If the judging result in block 402 shows that the obtained identifier is not present in the data structure, then a new entry for the requesting terminal device may be created in the data structure in block 412 and a corresponding number of access requests, timer and state flag comprised in the new entry may be initialized in block 413. For example, the number of access requests may be initialized as 1; and the state flag may be initialized as 'False'. The initialization of the timer may comprise initially setting the timer with a certain time period and starting the timer. For another example, the number of access requests may be initialized as an integer greater than 1 and at each time when it is updated, the number will be decreased by a certain number.

Although the above operations 401-418 are described in an order as illustrated in FIG. 4, those skilled in the art shall understand that these operations may not necessarily be performed in the order as illustrated. Some operations may be performed in a reverse order or in parallel, which will also fall within the scope of the present disclosure. For example, operations 405 and 406, operations 412 and 413 or operations 417 and 418 may be performed in parallel without departing from the scope of the present disclosure.

Apparently, the operations in blocks 401-403, 409, 410, 414 and 415 as illustrated in FIG. 4 may be regarded as sub-operations of the checking operation in block 320 of FIG. 3. The operations in blocks 404 and 416 as illustrated in FIG. 4 may be comprised in the determining operation in block 330 of FIG. 3. The operations in blocks 406-408, 411-413 and 418 as illustrated in FIG. 4 may constitute an updating operation as illustrated in block 350 of FIG. 3.

By virtue of method 300, the abnormality state of a UE may be determined so that the access attempt from the abnormal UE may be denied as early as possible and thus valuable resources on the air interface in the RAN and resources in the CN may not be meaninglessly consumed. Accordingly, the network operators may easily locate the problem and accurately decide actions to be taken.

Figure 5:
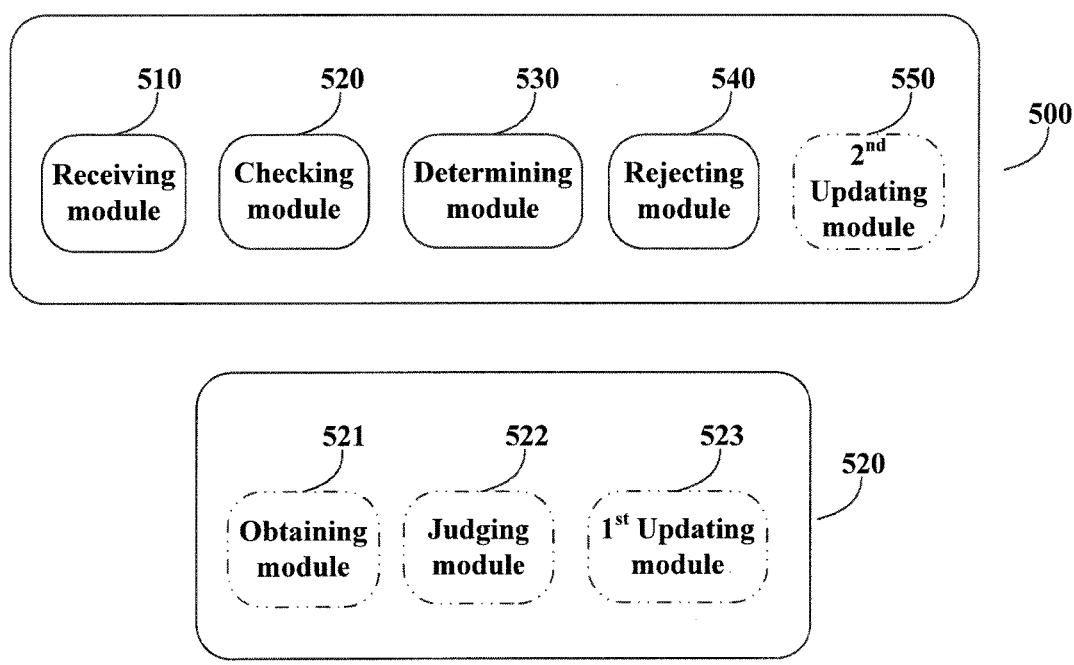
FIG. 5 illustrates a schematic block diagram of an apparatus 500 according to an embodiment of the present disclosure.

FIG. 5 illustrates a schematic block diagram of an apparatus 500 that may be configured to practice the embodiments described herein. The apparatus 500 may be implemented in or as a network element, such as eNodeB or RNC.

As illustrated in FIG. 5, the apparatus 500 comprises a receiving module 510, a checking module 520, a determining module 530 and a rejecting module 540.

The receiving module 510 is configured to receive an access request message from a terminal device that is the requesting terminal device. The access request message may comprise identification information of the requesting terminal device, including but not limited to TMSI, P-TMSI, IMSI and IMEI.

The checking module 520 is configured to check a data structure for maintaining state information of terminal devices from which access request messages have been received, in response to the reception of the access request message.

The determining module 530 is configured to determine whether the requesting terminal device is abnormal or not based on the checking of the data structure.

The rejecting module 540 is configured to reject the access request of the requesting terminal device in response that the requesting terminal device is determined to be abnormal.

In some embodiments, the checking module 520 may further comprise an obtaining module 521, a judging module 522 and a first updating module 523.

The obtaining module 521 may be configured to obtain an identifier of the requesting terminal device from the access request message after the access request message is received by the receiving module 510.

The judging module 522 may be configured to judge whether the obtained identifier is present in the data structure and to judge whether the state flag corresponding to the obtained identifier indicates abnormality, if it is already judged that the obtained identifier is present in the data structure.

The first updating module 523 may be configured to update the timer corresponding to the obtained identifier, if it is judged that the state flag corresponding to the obtained identifier indicates normality.

The judging module 522 may also be configured to judge whether the updated timer indicates expiry. If the updated timer indicates not expiry and the state flag corresponding to this timer indicates normality, the first updating module 523 may further be configured to update the number of access requests and the judging module 522 may further be configured to judge whether the updated number of access requests meets a predetermined threshold.

In some embodiments, the apparatus 500 may further comprise a second updating module 550, which is configured to delete an entry from the data structure if the timer comprised in this entry has expired and to create a new entry for the requesting terminal device if no entry corresponding to the requesting terminal device is present in the data structure and meanwhile initialize the timer, the number of access requests, and the state flag comprised in the new entry, for example according to the operations in blocks 406-408 and 412-423 as illustrated in FIG. 4.

The second updating module 550 may further be configured to change the state flag corresponding to the requesting terminal device to indicate abnormality, if the updated timer indicates not expiry and the updated number of access requests meets the predetermined threshold, for example according to the operation in block 418 as illustrated in FIG. 4.

Although the first and second updating modules 523 and 550 are described and illustrated as two separate modules, those skilled in the art shall understand that these two updating modules may be integrated as one updating module in practical applications without departing from the scope of the present disclosure.

In some embodiments, when the identifier of the requesting terminal device obtained by the obtaining module 521 is present in the data structure, the determining module 530 may further be configured to determine that the requesting terminal device is abnormal, if the state flag corresponding to the obtained identifier indicates abnormality or if this state flag indicates normality while the correspondingly updated timer indicates not expiry and the updated number meets the predetermined threshold.

It shall be understood that the modules 510-550 and 521-523 contained in the apparatus 500 are configured for practicing exemplary embodiments herein. Thus, the operations and features described above with respect to FIGS. 3 and 4 also apply to the apparatus 500 and the modules therein. For example, the checking module 520 may perform the operations in blocks 401-403, 409, 410, 414 and 415; the determining module 530 may perform the operations in blocks 404 and 416; the rejecting module 540 may perform the operations in blocks 405 and 417; and the second updating module 550 may perform the operations in blocks 406-408, 411-413 and 418. Thus, the detailed description of these modules is omitted herein for the sake of conciseness.

Figure 6:
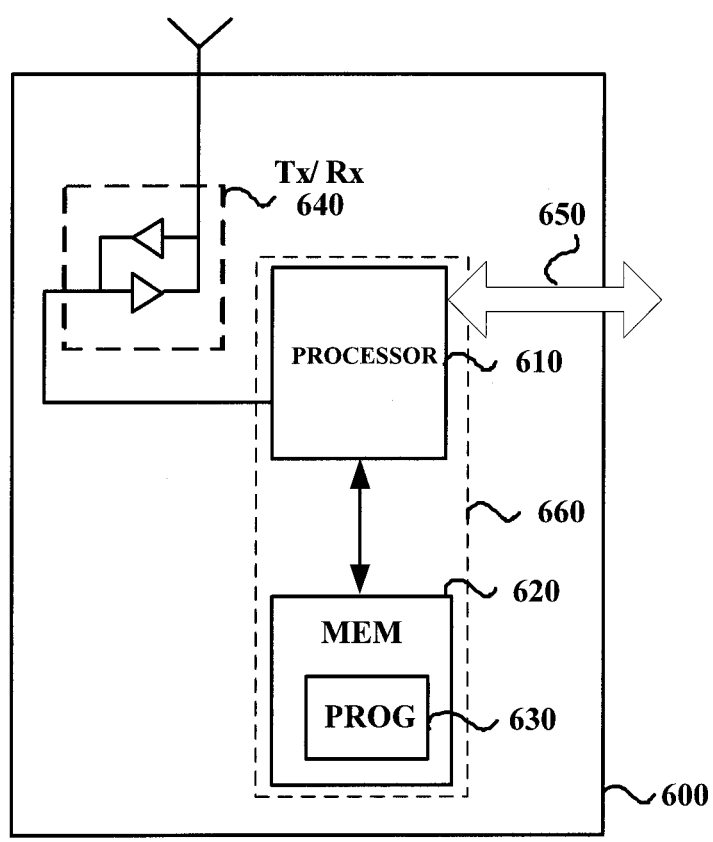
FIG. 6 illustrates a schematic block diagram of an apparatus 600 according to an embodiment of the present disclosure.

FIG. 6 illustrates a simplified block diagram of an apparatus 600 adapted for practicing exemplary embodiments of the present disclosure. The apparatus 600 may be implemented in or as a network element, such as eNodeB or RNC.

As shown in FIG. 6, the apparatus 600 comprises a data processor (DP) 610, a memory (MEM) 620 coupled to the DP 610, a suitable RF transmitter TX and receiver RX 640 coupled to the DP 610, and a communication interface 650 coupled to the DP 610. The MEM 620 stores a program (PROG) 630. The TX/RX 640 is for bidirectional wireless communications. Note that the TX/RX 640 has at least one antenna to facilitate communication, though in practice a BS may have several ones. The communication interface 650 may represent any interface that is required for communication with other network elements, such as an X2 interface for bidirectional communications between eNBs, an S1 interface for communication between the MME/S-GW and the eNB, or a Un interface for communication between the eNB and the RN. The apparatus 600 may be coupled via a data path to one or more external networks or systems, such as the internet, for example.

A combination of the processor 610 and the MEM 620 may form processing means 660 adapted to implement various embodiments of the present disclosure.

The PROG 630 is assumed to include program instructions that, when executed by the associated DP 610, enable the apparatus 600 to operate in accordance with the exemplary embodiments of this disclosure, as discussed with the methods in FIGS. 3-4. For example, the PROG 630 and the DP 610 may embody the checking module 520, the determining module 530, and the optional updating module 550 to perform the respective functions. The TX/RX 640 and the communication interface 650 may embody the receiving module 510 and the rejecting module 540 to perform the functions of receiving the access request and rejecting the access request.

Various embodiments of the present disclosure may be implemented in computer software executable by the DP 610 of the apparatus 600, or in hardware, firmware, or in a combination of software and hardware.

The MEM 620 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatus 600, there may be several physically distinct memory units in the apparatus 600. The DP 610 may be of any type suitable to the local technical environment, and may include one or more of general purpose computers, special purpose computers, microprocessors, digital signal processors (DSPs) and processors based on multicore processor architecture, as non limiting examples. The apparatus 600 may have multiple processors, such as for example an application specific integrated circuit chip that is slaved in time to a clock which synchronizes the main processor.

Although the above embodiments are described in the context of a LTE or WCDMA network for illustrative purpose, those skilled in the art will recognize that the embodiments disclosed herein may also be applied to various other types of communications networks which may have a service failure problem.

Exemplary embodiments of the present disclosure have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method in a network element for access controlling, the method comprising:
   receiving an access request message from a terminal device;
   checking a data structure for maintaining state information of terminal devices from which the network element has received access request messages, in response to the reception of the access request message, wherein the data structure comprises entries corresponding respectively to the terminal devices from which the network element has received the access request messages, wherein each of the entries at least comprises: an identifier of a corresponding terminal device; a number of access requests of the corresponding terminal device; a timer, of the corresponding terminal device, for showing a time elapsed since a corresponding entry was started; and a state flag for indicating abnormality or normality of the corresponding terminal device, and wherein said checking the data structure comprises:
  obtaining an identifier of the requesting terminal device from the received access request message;
  judging whether the obtained identifier is present in the data structure;
  when it is judged that the obtained identifier is present in the data structure, judging whether a state flag corresponding to the obtained identifier indicates abnormality;
  when it is judged that the state flag corresponding to the obtained identifier indicates normality, updating a timer corresponding to the obtained identifier and judging whether the updated timer indicates expiry; and
  when the updated timer indicates not expiry, updating the number of access requests corresponding to the requesting terminal device and judging whether the updated number of access requests meets a predetermined threshold;
  determining whether the requesting terminal device is abnormal based on said checking of the data structure, wherein said determining comprises:
    in a case that the obtained identifier is present in the data structure,
    when the state flag corresponding to the obtained identifier indicates abnormality, determining that the requesting terminal device is abnormal; and
    when the updated timer indicates not expiry and the updated number of access requests meets the predetermined threshold, determining that the requesting terminal device is abnormal; and
  rejecting the access request of the requesting terminal device in response to determining that the requesting terminal device is abnormal.

2. The method according to claim 1, further comprising updating the data structure, wherein said updating the data structure comprises:
  in a case that the obtained identifier is not present in the data structure, creating a new entry for the requesting terminal device in the data structure and initializing the number of access requests, the timer, and the state flag comprised in the new entry; and
  in the case that the obtained identifier is present in the data structure:
    when the state flag corresponding to the obtained identifier indicates abnormality, updating the timer corresponding to the obtained identifier and when the updated timer indicates expiry, deleting an entry comprising the obtained identifier from the data structure; and
    when the state flag corresponding to the obtained identifier indicates normality,
      in a case that the updated timer indicates expiry, deleting the entry comprising the obtained identifier from the data structure; and
      in a case that the updated timer indicates not expiry and the updated number meets the predetermined threshold, causing the state flag corresponding to the obtained identifier to indicate abnormality.

3. The method according to claim 1, wherein
the identifier of the corresponding terminal device comprises one of: an international mobile subscriber identity (IMSI), a temporary mobile subscriber identity (TMSI), a packet temporary mobile subscriber identity (P-TMSI), and an international mobile equipment identity (IMEI).

4. An apparatus configured to control access in a network element, the apparatus comprising one or more processors configured to:
  receive an access request message from a terminal device;
  check a data structure for maintaining state information of terminal devices from which the network element has received access request messages, in response to the reception of the access request message, wherein the data structure comprises entries corresponding respectively to the terminal devices from which the network element has received the access request messages, wherein each of the entries at least comprises: an identifier of a corresponding terminal device; a number of access requests of the corresponding terminal device; a timer, of the corresponding terminal device, for showing a time elapsed since a corresponding entry was started; and a state flag for indicating abnormality or normality of the corresponding terminal device, and wherein to check the data structure, the one or more processors are further configured to:
    obtain an identifier of the requesting terminal device from the received access request message;
    judge whether the obtained identifier is present in the data structure;
    when it is judged that the obtained identifier is present in the data structure, judge whether the state flag corresponding to the obtained identifier indicates abnormality;
    when it is judged that the state flag corresponding to the obtained identifier indicates normality, update the timer corresponding to the obtained identifier and judge whether the updated timer indicates expiry; and
    when the updated timer indicates not expiry, update the number of access requests corresponding to the requesting terminal device and judge whether the updated number of access requests meets a predetermined threshold;
  determine whether the requesting terminal device is abnormal based on said check of the data structure, wherein to determine whether the requesting terminal device is abnormal, the one or more processors are further configured to:
    in the case that the obtained identifier is present in the data structure,
      when the state flag corresponding to the obtained identifier indicates abnormality, determine that the requesting terminal device is abnormal; and
      when the updated timer indicates not expiry and the updated number meets the predetermined threshold, determine that the requesting terminal device is abnormal; and
  reject the access request of the requesting terminal device in response to the determination that the requesting terminal device is abnormal.

5. The apparatus according to claim 4, wherein the one or more processors are further configured to:
  in a case that the obtained identifier is not present in the data structure, create a new entry for the requesting terminal device in the data structure and initialize the number of access requests, the timer, and the state flag comprised in the new entry; and in the case that the obtained identifier is present in the data structure:
- when the state flag corresponding to the obtained identifier indicates abnormality, update the timer corresponding to the obtained identifier and when the updated timer indicates expiry, delete an entry comprising the obtained identifier from the data structure; and
- when the state flag corresponding to the obtained identifier indicates normality,
  - in a case that the updated timer indicates expiry, delete the entry comprising the obtained identifier from the data structure; and
  - in a case that the updated timer indicates not expiry and the updated number of access requests meets the predetermined threshold, cause the state flag to indicate abnormality.

6. The apparatus according to claim 4, wherein the identifier of the corresponding terminal device comprises one of: an international mobile subscriber identity (IMSI), a temporary mobile subscriber identity (TMSI), a packet temporary mobile subscriber identity (P-TMSI), and an international mobile equipment identity (IMEI).

7. An apparatus configured to control access in a network element, the apparatus comprising a processor and a memory, said memory containing instructions executable by said processor, whereby said apparatus is operative to:
receive an access request message from a terminal device;
check a data structure for maintaining state information of terminal devices from which the network element has received access request messages, in response to the reception of the access request message, wherein the data structure comprises entries corresponding respectively to the terminal devices from which the network element has received the access request messages, wherein each of the entries at least comprises: an identifier of a corresponding terminal device; a number of access requests of the corresponding terminal device; a timer, of the corresponding terminal device, for showing a time elapsed since a corresponding entry was started; and a state flag for indicating abnormality or normality of the corresponding terminal device, and wherein to check the data structure, said apparatus is further operative to:
  obtain an identifier of the requesting terminal device from the received access request message;
  judge whether the obtained Identifier is present in the data structure,
  when it is judged that the obtained identifier is present in the data structure, judge whether the state flag corresponding to the obtained identifier indicates abnormality;
  when it is judged that the state flag corresponding to the obtained identifier indicates normality, update the timer corresponding to the obtained identifier and judge whether the updated timer indicates expiry; and
  when the updated timer indicates not expiry, update the number of access requests corresponding to the requesting terminal device and judge whether the updated number of access requests meets a predetermined threshold;
determine whether the requesting terminal device is abnormal based on said check of the data structure, wherein to determine whether the requesting terminal device is abnormal, the apparatus is further operative to:
  in the case that the obtained identifier is present in the data structure,
    when the state flag corresponding to the obtained identifier indicates abnormality, determine that the requesting terminal device is abnormal; and
    when the updated timer indicates not expiry and the updated number meets the predetermined threshold, determine that the requesting terminal device is abnormal; and
  reject the access request of the requesting terminal device in response to the determination that the requesting terminal device is abnormal.

8. An apparatus configured to control access in a network element, the apparatus comprising processing means configured to: receive an access request message from a terminal device;
check a data structure for maintaining state information of terminal devices from which the network element has received access request messages, in response to the reception of the access request message, wherein the data structure comprises entries corresponding respectively to the terminal devices from which the network element has received the access request messages, wherein each of the entries at least comprises: an identifier of a corresponding terminal device; a number of access requests of the corresponding terminal device; a timer, of the corresponding terminal device, for showing a time elapsed since a corresponding entry was started; and a state flag for indicating abnormality or normality of the corresponding terminal device, and wherein to check the data structure, said processing means is further configured to:
  obtain an identifier of the requesting terminal device from the received access request message;
  judge whether the obtained identifier is present in the data structure;
  when it is judged that the obtained identifier is present in the data structure, judge whether the state flag corresponding to the obtained identifier indicates abnormality;
  when it is judged that the state flag corresponding to the obtained identifier indicates normality, update the timer corresponding to the obtained identifier and judge whether the updated timer indicates expiry; and
  when the updated timer indicates not expiry, update the number of access requests corresponding to the requesting terminal device and judge whether the updated number of access requests meets a predetermined threshold;
determine whether the requesting terminal device is abnormal based on said check of the data structure, wherein to determine whether the requesting terminal device is abnormal, said processing means is furthermore configured to:
in the case that the obtained identifier is present in the data structure,
  when the state flag corresponding to the obtained identifier indicates abnormality, determine that the requesting terminal device is abnormal; and
  when the updated timer indicates not expiry and the updated number meets the predetermined threshold, determine that the requesting terminal device is abnormal; and reject the access request of the requesting terminal device in response to the determination that the requesting terminal device is abnormal.

9. A non-transitory computer-readable medium comprising instructions which, when executed on at least one processor, cause the at least one processor to carry out the method according to claim 1.

* * * * *